United States Patent
Shrum (10) Patent No.: US 11,599,544 B2
(45) Date of Patent: Mar. 7, 2023

(54) PRIMARY TAGGING IN A DATA STREAM

(71) Applicant: Acxiom LLC, Conway, AR (US)

(72) Inventor: Thomas Lawrence Shrum, Conway, AR (US)

(73) Assignee: Acxiom LLC, Conway, AR (US)

( * ) Notice: Subject to any disclaimer, the term of this patent is extended or adjusted under 35 U.S.C. 154(b) by 554 days.

(21) Appl. No.: 16/708,034

(22) Filed: Dec. 9, 2019

(65) Prior Publication Data

US 2021/0065216 A1 Mar. 4, 2021

Related U.S. Application Data

(60) Provisional application No. 62/891,689, filed on Aug. 26, 2019, provisional application No. 62/891,679, filed on Aug. 26, 2019, provisional application No. 62/891,683, filed on Aug. 26, 2019.

(51) Int. Cl.

| | |
|---|---|
| *G06Q 30/02* | (2023.01) |
| *G06F 16/2455* | (2019.01) |
| *G06F 16/906* | (2019.01) |
| *G06F 16/22* | (2019.01) |
| *G06F 16/242* | (2019.01) |
| *G06F 40/117* | (2020.01) |
| *G06Q 30/0201* | (2023.01) |
| *H04L 67/561* | (2022.01) |

(52) U.S. Cl.
CPC .... *G06F 16/24568* (2019.01); *G06F 16/2246* (2019.01); *G06F 16/244* (2019.01); *G06F 16/906* (2019.01); *G06F 40/117* (2020.01); *G06Q 30/0201* (2013.01); *H04L 67/561* (2022.05)

(58) Field of Classification Search
CPC ........................................................ G06Q 30/02
USPC ........................................................ 705/14.02
See application file for complete search history.

(56) References Cited

U.S. PATENT DOCUMENTS

| | | | |
|---|---|---|---|
| 7,882,077 B2 | 2/2011 | Gokhale et al. | |
| 8,364,680 B2 | 1/2013 | Bilbrey | |
| 8,397,285 B2 | 3/2013 | Balakrishnan et al. | |

(Continued)

FOREIGN PATENT DOCUMENTS

WO 2019133928 A1 7/2019

OTHER PUBLICATIONS

"How Custom Tagging Creates a Successful Data Management Strategy," Data Dynamics, Inc., retrieved Jul. 17, 2019.

(Continued)

*Primary Examiner* — Afaf Osman Bilal Ahmed (57) ABSTRACT

A method of searching data streams arriving over a network in order to look for a predetermined reserved set of indicia first identifies and then tags the data per the found information in a reserved indicia set. The tags are applied by "StreamTagApps" (STAs), which are small, quickly executing software applications that are each focused on the tagging of data that includes a particular indicium in order to make the identification process rapid. The method thus allows very quick action to be taken in order to maximize the usefulness of the data. Multiple STAs in one or both of horizontal and vertical configurations may be constructed in order to provide any necessary level of speed or take full advantage of an available hardware configuration.

29 Claims, 5 Drawing Sheets (56) References Cited

U.S. PATENT DOCUMENTS

| | | |
|---|---|---|
| 8,595,234 B2 | 11/2013 | Siripurapu et al. |
| 8,769,576 B2 | 7/2014 | Burkitt et al. |
| 8,935,204 B2 | 1/2015 | Peto et al. |
| 9,098,531 B2 | 8/2015 | Desmond et al. |
| 9,225,793 B2 | 12/2015 | Dutta et al. |
| 9,256,667 B2 | 2/2016 | Koudas et al. |
| 9,270,515 B1 | 2/2016 | Postelnicu et al. |
| 9,286,295 B2 | 3/2016 | Beadles |
| 9,465,856 B2 | 10/2016 | Branton et al. |
| 9,524,282 B2 | 12/2016 | Algreatly |
| 9,710,539 B2 | 7/2017 | Dey et al. |
| 9,898,748 B1 | 2/2018 | Taylor et al. |
| 10,097,432 B2 | 10/2018 | Stevens et al. |
| 10,191,974 B2 | 1/2019 | Indeck et al. |
| 10,248,719 B2 | 4/2019 | Sharma et al. |
| 10,250,640 B2 | 4/2019 | Redlich et al. |
| 2006/0253503 A1* | 11/2006 | Barrs .................. G06F 11/1448 707/999.203 |
| 2007/0250901 A1 | 10/2007 | McIntire et al. |
| 2008/0010294 A1 | 1/2008 | Norton et al. |
| 2008/0288347 A1 | 11/2008 | Sifry |
| 2009/0251277 A1 | 10/2009 | O'Hara et al. |
| 2012/0124090 A1 | 5/2012 | Matz et al. |
| 2013/0117464 A1 | 5/2013 | Brown et al. |
| 2014/0019555 A1 | 1/2014 | Cai et al. |
| 2016/0134667 A1 | 5/2016 | Suresh et al. |
| 2016/0210657 A1 | 7/2016 | Chittilappilly et al. |
| 2016/0299977 A1 | 10/2016 | Hreha |
| 2017/0013127 A1 | 1/2017 | Xue et al. |
| 2019/0080354 A1 | 3/2019 | Booker et al. |
| 2019/0147012 A1* | 5/2019 | Slovak .................. H04L 67/02 709/231 |

OTHER PUBLICATIONS

"TagApp—Apps on Google Play," retrieved Jul. 16, 2019 (Jan. 16, 2016).

Nanculef et al., "Efficient Classification of Multi-Labelled Text Streams by Clashing," arXiv, Apr. 12, 2016.

Atkinson et al., "Near Real Time Information Mining in Multilingual News," www 2009 madrid!, Apr. 23, 2009.

Bharti et al., "Sarcastic Sentiment Detection in Tweets Streamed in Real Time: A Big Data Approach," Digital Comm. and Networks 2 (2016) 108-121 (Aug. 1, 2016).

"Event Driven Feeds," Bloomberg Professional Services, retrieved Jul. 17, 2019.

Menon et al., "Fast ASR-Free and Almost Zero-Resource Keyword Spotting Using DTW and CNNs for Humanitarian Monitoring," arXiv, Jun. 25, 2018.

"Marketing Getting Started," Heap, retrieved Jul. 16, 2019.

"Hashtags for Instagram—Apps on Google Play," retrieved Jul. 16, 2019 (Dec. 1, 2018).

International Search Report and Written Opinion for Int'l App. No. PCT/US2019/065249 (dated Feb. 28, 2020).

\* cited by examiner

PRIMARY TAGGING IN A DATA STREAM

CROSS-REFERENCE TO RELATED APPLICATIONS

This application claims the benefit of US Provisional Patent Application Nos. 62/891,679, 62/891,683, and 62/891,689, each of which was filed on Aug. 26, 2019. Each of these applications is incorporated by reference as if fully set forth herein.

STATEMENT REGARDING FEDERALLY SPONSORED RESEARCH OR DEVELOPMENT

Not applicable.

BACKGROUND OF THE INVENTION

Streams of electronic data are used in many applications today. As the quantity of available data continues to increase in many fields, more advanced methods are required for receiving, storing, and cataloging the data. There is a particularly strong need for new methods of cataloging data in applications where the "freshness" of the data is a significant aspect of the value of the data. For example, data indicating that a particular consumer is "in market" for a new truck must be acted on quickly, or the customer may have already made a purchase from a competitor before the data is fully processed, and thus the opportunity will be missed. Another example is data about a consumer's location, since this may change in an extremely short timeframe. For example, it may be valuable to know that a consumer is standing near a particular retailer or driving toward a particular coffee shop, in which case marketing messages from these retailers may be more effective if they reach the consumer before the opportunity has passed. Thus although these kinds of data may be highly valuable, they become worthless if the data cannot be processed quickly enough to act before the opportunity passes. If one waits to use the data until after all of the processing, writing of data to storage, and formatting and cataloging of data has been complete as in traditional data processing systems, then it may be too late to meaningfully use the data and the value of the data has been lost.

BRIEF SUMMARY OF THE INVENTION

The present invention is directed to a method and system by which an enterprise may scan data streams arriving over a network in order to look for a predetermined reserved set of words, numbers, glyphs, or other indicia, and then tags the data per the found information in the reserved indicia set. The tags are applied by data stream tagging applications or "StreamTagApps" (STAs), which are a set of small, quickly executing software applications that are each focused on the tagging of data that includes a particular word, term, symbol, or other indicia in order to make the identification process as rapid as possible. Because the tags are applied to the incoming data stream, rather than after any subsequent storage and processing steps, information from the tag will be available very quickly, enabling the data processor to act quickly in response to the tags that were applied to the data, rather than waiting for storage, formatting, and full cataloging of the data. In this way, the process and system allows very quick action to be taken in order to maximize the usefulness of the data, in some cases allowing for a real-time response.

These and other features, objects and advantages of the present invention will become better understood from a consideration of the following detailed description in conjunction with the drawings.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In the first step of a process according to an implementation of the invention, a variety of data is sourced from many different potential sources. These sources may include the Internet (such as from companies like Amazon, WhatsApp, and Instagram); Internet of Things (IoT) devices such as web cameras, refrigerators, and home automation devices; or from customer data files. As data streams in, data stream tagging applications ("StreamTagApps" or STAs) focused on single data elements (e.g., name, address, account number, or purchased product) peruse the stream for that element alone. The only purpose of each STA is to search for one particular indicium, and thus the coding of the STA can be very short and its operational speed can be very high in order to keep up with the incoming data stream. Upon finding the data element each STA is looking for, it tags the data appropriately and continues to peruse other data in the stream. For example, suppose an item of data in a stream contains both a name and an address. The STA that is looking for names will tag that data item "name" and the STA that is looking for addresses will tag that same data item "address." These tags can be added as appended text, an appended number or code indicating certain text, or by other means. With enough different STAs sifting through the data stream as it comes in, a great deal of information may be known about the data immediately, without waiting to fully process, store, and catalogue the data. In certain embodiments, this tagging operation can occur while the information is still streaming in from outside of the data processor's firewall, and thus occurs before the data processor executes any other manipulation of the data at all. The tagged data may be sent directly to a marketing process for use of the data in real time, or may be stored in a tagged data database in order to make it acceptable to other processes.

STAs can be scaled in a manner that makes them more efficient. For example, STAs may be scaled vertically by running the STAs on multiple processors or multiprocessor architectures comprising multiple cores. In addition, STAs may be scaled horizontally by having multiple different STAs running simultaneously. Of course even greater efficiency can be achieved by scaling the STAs both vertically and horizontally, thereby handling data volumes of any size efficiently by scaling up the STAs in a manner corresponding with the data volume.

An STA should be scaled horizontally (i.e., another app identical in function to the original begins to function) whenever the ratio of time performing work to passed time becomes greater than 1:2. For example, an app would scale whenever it takes 1 second performing its task over a period of 2 seconds.

An STA should be scaled vertically (e.g., another computer having identical software installed to the original begins to function) whenever the estimated average time for any of memory, CPU, disk, or I/O buses to achieve 67% of maximum is less than the time it takes to scale (TTS). For example, if TTS is 5 minutes, then a computer would scale when 23% of total memory is being used and memory usage is increasing on average by 11% per minute over the past minute (time to 67% of memory is 4 minutes while TTS is 5 minutes).

An STA should vertically de-scale (e.g., a computer would remove itself from the pool of computing resources) whenever doing so would not cause an STA scale event, either horizontally or vertically.

STAs may be applied where data would need to be processed immediately in order to reap the greatest value from that data. For instance, name and address data could be used to identify consumers in advance of other processing.

Figure 1:
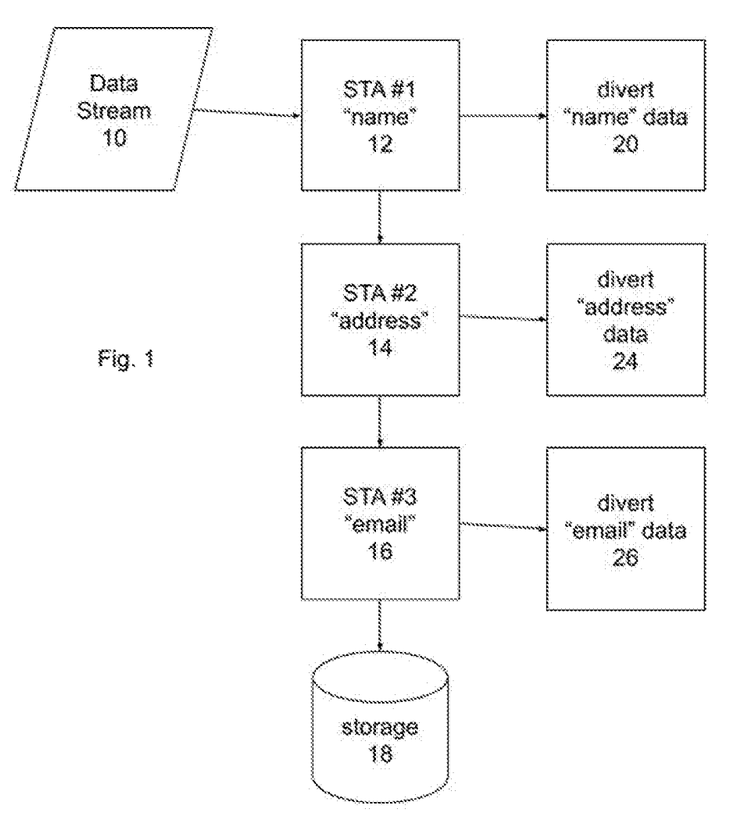
FIG. 1 is an exemplary data flow diagram according to an implementation of the invention showing three different data stream tagging applications or "StreamTagApps" (STAs) functioning to tag incoming data.

Referring now to FIG. 1, a flow chart illustrates the steps in the process for making use of certain implementations of the present invention. A connection is made to data stream 10, which consists of a stream of data items. In this case, data stream 10 is comprised of consumer records, but the data stream can be any type of electronic information in other implementations. The data is passed to a controller or controllers that host multiple STAs. STA #1, at block 12, searches the stream for "name" data as each record or other data item streams past. If the data is found, then the data item is tagged with the "name" tag, and optionally may be diverted from the main data stream (or a copy diverted from the main data stream) in order to immediately or later make use of this information at step 20. Multiple different STAs may exist on the same computer core. STA #2 at block 14 and STA #3 at block 16 perform similar processes for "address" data and "email" data. The "address" data may be diverted at step 24 and the "email" data may be diverted at step 26. All of this processing takes place before the data from data stream 10 is stored at electronic storage 18, and thus also before the data is formatted. Although three STAs each for a different data term are shown, it will be understood that any number of STAs could be employed in various alternative implementations.

Figure 2:
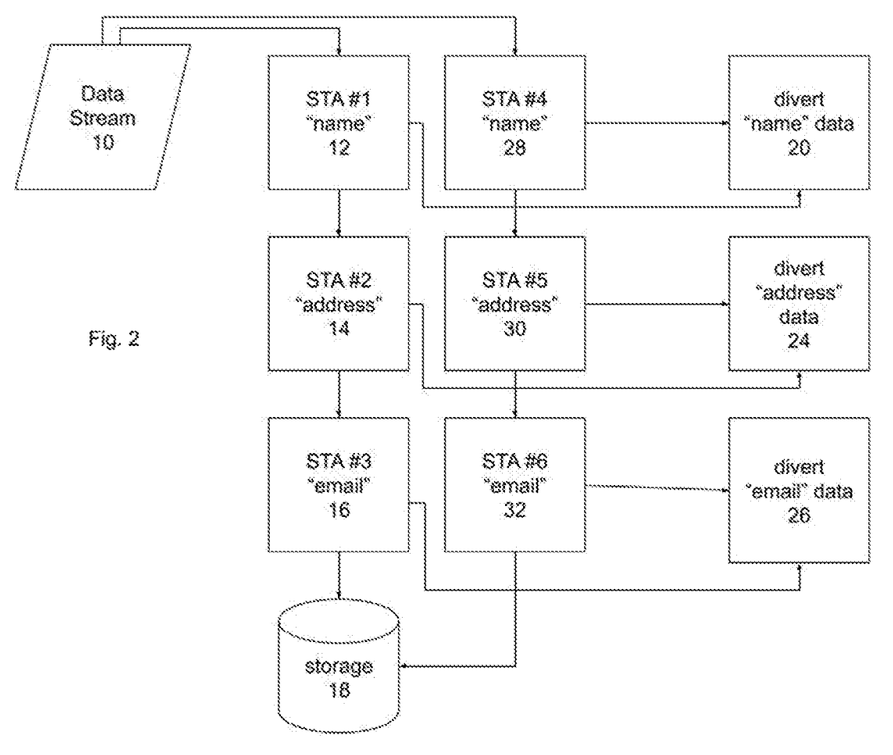
FIG. 2 is an exemplary data flow diagram according to an implementation of the invention using vertically scaled STAs to tag incoming data.

Referring to FIG. 2, a different arrangement is shown where the STAs are scaled vertically for greater efficiency. In this case, data stream 10 is divided into two parallel streams to facilitate parallel processing. In this model, there may be multiple compute cores that each run an instantiation of the same STA, as well as multiple different STAs running on the same compute core. New STA #4 at block 28, STA #5 at block 30, and STA #6 at block 32 provide parallel searching for the "name," "address," and "email" fields, respectively, on a second compute core. All six STAs optionally divert data once tagged as explained above with reference to FIG. 1. As in the example of FIG. 1, all of this processing takes place before the data from data stream 10 is stored or formatted. It may be seen that by arranging the STAs in this manner and given a hardware platform with sufficiently parallel resources, the system can keep up with the rate of the data flow no matter how fast the data from data stream 10 comes in. The degree to which the processing is scaled vertically therefore can be a function of how fast the corresponding data stream 10 will operate.

Figure 3:
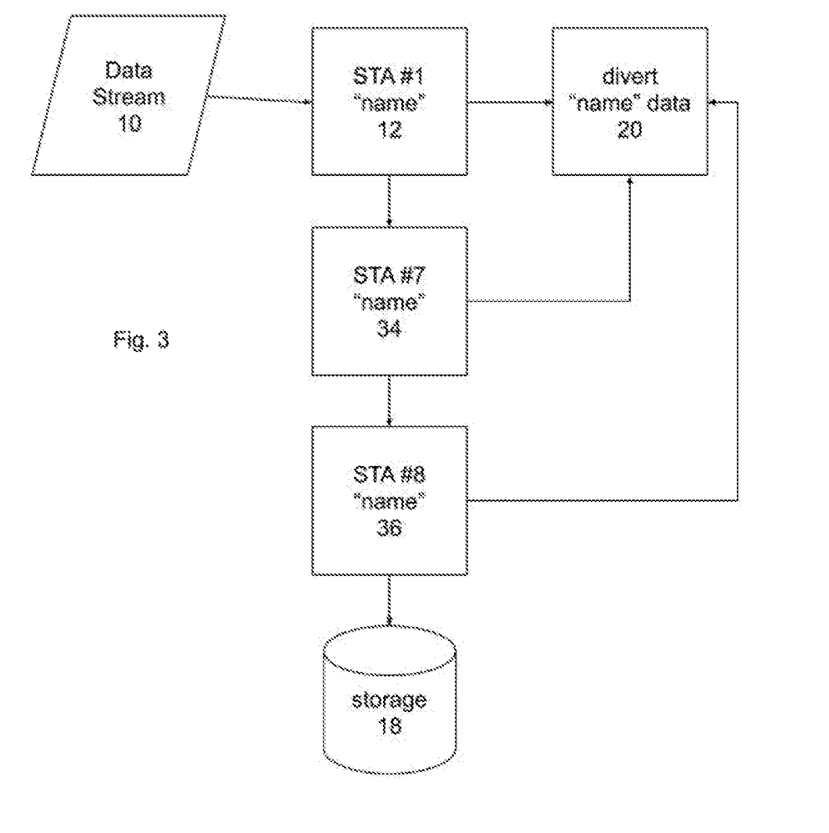
FIG. 3 is an exemplary data flow diagram according to an implementation of the invention using horizontally scaled STAs to tag incoming data.

Referring to FIG. 3, a different arrangement is shown in which the STAs are scaled horizontally for greater efficiency. In this case, data stream 10 passes through three different STAs for "name" data, blocks 12, 34, and 36, which are aligned in a "horizontal" fashion, that is, such that they are each searching data from the same data stream 10 at the same time. In one implementation from this example, each STA may search a subset of the data elements as the data stream passes through, and thus all data items are searched in the data stream but the data stream may be searched more quickly as a whole. Each of the three STAs may divert data tagged for "name" at block 20. As noted above, an arrangement that combines the features shown in FIG. 2 and FIG. 3 is another embodiment of the invention, which may produce the greatest efficiency. Thus the design may take full advantage of multiple compute cores each running an instantiation of the same STA, and each compute core may run either a single STA or an array of different STAs, in order to adequately inspect the data stream so that all data are appropriately tagged. Either of the versions of FIG. 2 and FIG. 3, or the combination thereof, may be scaled to any arbitrary level to manage as large of a data feed 10 as is needed and as many different types of tags as may be useful for any particular application.

While data continues to be streamed to the enterprise over the network, STA-tagged data elements may be sent via an application programming interface (API) for immediate processing, ahead of the time at which the data is written to storage. Alternative embodiments may use a method other than an API in order to begin the processing of data before being written to storage at the enterprise, depending upon the particular application to which the various embodiments of the method and system is being applied.

Figure 4:
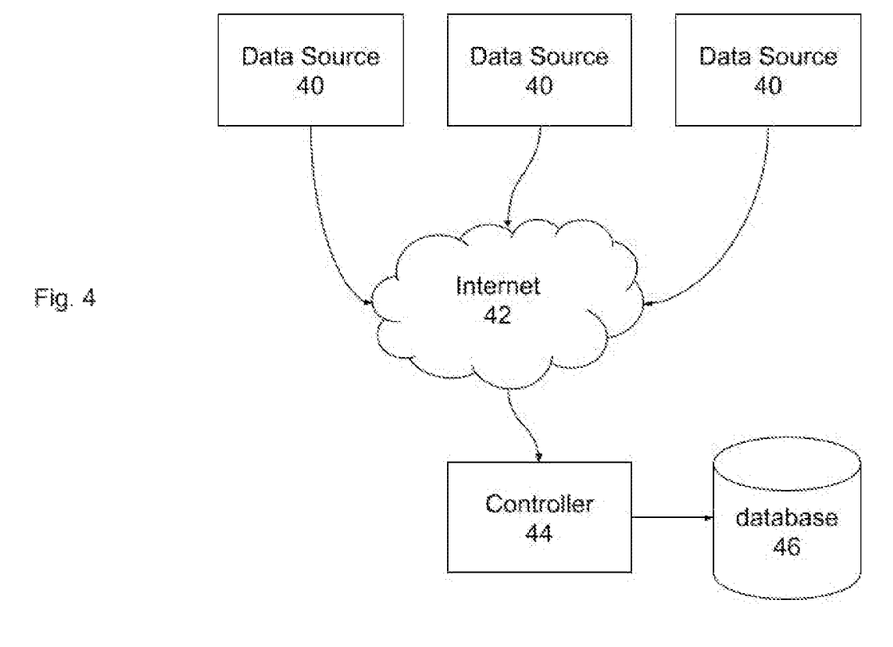
FIG. 4 is a diagram of a system according to an implementation of the invention.

The elements that make up a system according to an implementation of the invention are shown on FIG. 4. Multiple data sources 40 are connected to controller 44 over Internet 42. In this way, data is fed into the system as described previously. Controller 44 is where the processing of the data occurs. Controller 44 is in communication with storage 46, which is where the results of the processing are stored after formatting and cataloguing.

Figure 5:
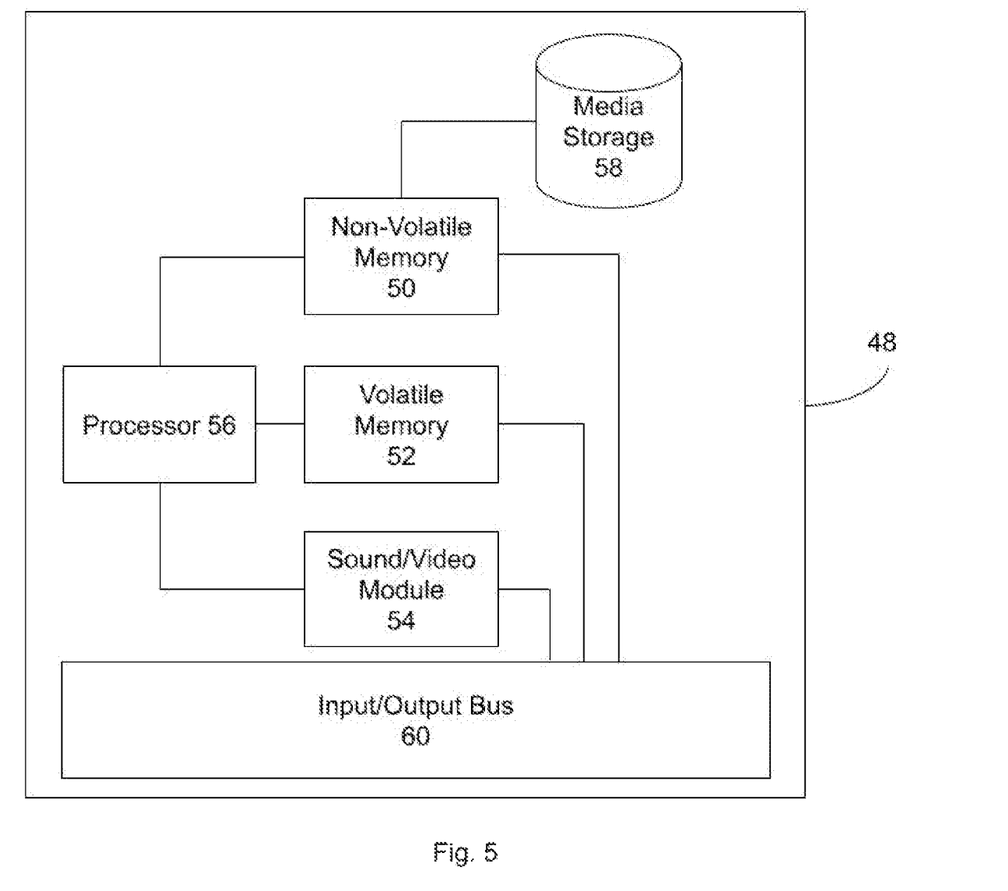
FIG. 5 is a diagram of a computing device according to an implementation of the invention.

A computing system 48 that may be used to implement controller 44, as shown in FIG. 5. Generally, computing system 48 may include digital storage such as a magnetic disk, an optical disk, flash storage, non-volatile storage, or other storage devices. Data and instructions may be stored in the digital storage such as in a database. The computing system 48 may have a processor 56 that is physically configured to best process executable instructions. It may also have an optional sound/video module 54, which operates to display video and play sound. The computing system 48 may also have volatile memory 52, such as solid-state RAM memory in one or more levels or caches, and non-volatile memory 50. There also may be an input/output bus 60 that transmits data and/or instructions to and from the various user input/output devices, such as a keyboard or monitor (not shown). The input/output bus 60 also may control communications with other devices, either through wireless or wired devices.

The storage 46 of FIG. 4 may be integrated into the media storage 58 of FIG. 5, or may be physically separate. The storage 46 may also be part of a cloud of computing devices and may be stored in a distributed manner across a plurality of computing devices.

The user devices, computers and servers described herein may be general purpose computers that may have, among other elements, a microprocessor; volatile and/or non-volatile memory; one or more mass storage devices (i.e., a hard drive); various user input devices, such as a mouse, a keyboard, or a microphone; and a video display system. The user devices, computers and servers described herein may be running on any one of many operating systems. The servers may be a cluster of web servers, which may each be supported by a load balancer that decides which of the cluster of web servers should process a request based upon the current request-load of the available server(s). The devices described herein may communicate via networks, including the Internet, WAN, LAN, Wi-Fi, other computer networks, and/or any combination of them. These may be implemented as wired and wireless conduits, including copper, fiber optic, microwaves, and other forms of radio frequency, electrical and/or optical communication techniques. It should also be understood that any network may be connected to any other network in a different manner. The interconnections between computing systems described here are examples. Any device described herein may communicate with any other device via one or more networks. The example embodiments may include additional devices and networks beyond those shown. Further, the functionality described as being performed by one device may be distributed and performed by two or more devices. Multiple devices may also be combined into a single device, which may perform the functionality of the combined devices.

Any of the software components or functions described in this application, may be implemented as software code or computer readable instructions that may be executed by at least one processor using any suitable computer language such as, for example, Java, C++, or Python.

The software code may be stored as a series of instructions or commands on a non-transitory computer readable medium, such as a random-access memory (RAM), a read-only memory (ROM), a magnetic medium such as a hard-drive or a floppy disk, or an optical medium such as a CD/DVD-ROM. Any such computer readable medium may reside on or within a single computational apparatus and may be present on or within different computational apparatuses within a system or network.

Generally speaking, a non-transitory computer readable medium may include electronic, magnetic, or optical media—e.g., disk or CD/DVD-ROM. The terms "tangible" and "non-transitory," as used herein, are intended to describe a computer-readable storage medium (or memory) excluding propagating electromagnetic signals, but are not intended to otherwise limit the type of physical computer-readable storage device that is encompassed by the phrase computer-readable medium or memory. For example, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a wired or wireless network.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as presented in the following claims.

The invention claimed is:

1. A method for primary tagging of data, comprising the steps of:
   a. receiving a data stream at a controller, wherein the data stream comprises a plurality of data items being directed into a data heap from a plurality of separate data sources, wherein the data heap comprises a binary tree in which a key value in each of a plurality of parent nodes is always greater than or equal to a key value in a corresponding child node or always less than or equal to the key value in such corresponding node;
   b. before storing each data element in the data heap, applying a first data stream tagging application to each data item, wherein the first data stream tagging application searches each data item for a match to a first indicium;
   c. if a first indicium match is found, tagging by the first data stream tagging application the data item having the matched first indicium with a first tag text string;
   d. before storing each data element in the data heap, applying a second data stream tagging application to each data item, wherein the second data stream tagging application searches each data item for a match to a second indicium, wherein the first indicium and second indicium are not the same;
   e. if a second indicium match is found, tagging by the second data stream tagging application the data item having the matched second indicium with a second tag comprising a second text string; and
   f. after applying the first data stream tagging application and second data stream tagging application to the data stream, storing each data item in the data stream in the data heap binary tree.

2. The method of claim 1, wherein steps (b) to (e) are performed before any data item in the data stream is formatted into the data heap.

3. The method of claim 2, wherein steps (b) to (e) are performed before any data item in the data stream is catalogued into the data heap.

4. The method of claim 3, wherein the step of tagging the data item comprises the step of making a copy of the data item and sending the copy of the data item to one or both of an application programming interface or a tagged data database.

5. The method of claim 3, wherein the step of tagging the data item comprises the step of moving the data item from the data stream such that the data item is not stored in the data heap at step (f).

6. The method of claim 3, further comprising the steps of:
   a. after receiving the data stream at the controller, dividing the data stream into first and second data streams each containing a plurality of data items;
   b. applying the first data stream tagging application to each data item in the first data stream, and simultaneously applying a third data stream tagging application to each data item in the second data stream, wherein the first and third data stream tagging applications search each data item in the first data stream for a match to the first indicium;
   c. if a first indicium match is found by either the first or third data stream tagging applications, tagging by either the first or third data stream tagging application the data item having the matched first indicium with the first tag;
   d. applying the second data stream tagging application to each data item in the first data stream, and simultaneously applying a fourth data stream tagging application to each data item in the second data stream, wherein the second and fourth data stream tagging applications search each data item in the second data stream for a match to the second indicium; and
   e. if a second indicium match is found by either the second or fourth data stream tagging applications, tagging by either the second or fourth data stream tagging applications the data item having the matched second indicium with the second tag.

7. The method of claim 6, further comprising the step of running the first and third data stream tagging applications on different physical processors, and the step of running the second and fourth data stream tagging applications on different physical processors.

8. A method for primary tagging of data, comprising the steps of:
   a. receiving a data stream at a controller, wherein the data stream comprises a plurality of data items being directed into a data heap from a plurality of separate sources, wherein the data heap comprises a binary tree in which a key value in each of a plurality of parent nodes is always greater than or equal to a key value in a corresponding child node or always less than or equal to the key value in such corresponding node;
   b. applying a first data stream tagging application to a first subset of the data items in the data stream, wherein the first data stream tagging application searches each data item in the first subset for a match to an indicium;
   c. if an indicium match is found by the first data stream tagging application, tagging by the first data stream tagging application the data item having the matched indicium with a first text string;
   d. applying a second data stream tagging application to a second subset of the data items in the data stream, wherein the first subset of data items and second subset of data items are exclusive of each other, and wherein the second data stream tagging application searches each data item in the second subset for a match to the indicium;
   e. if the indicium match is found by the second data stream tagging application, tagging by the second data stream tagging application the data item having the matched indicium with a second text string; and
   f. after applying the first data stream tagging application and second data stream tagging application to the data stream, storing each data item in the data stream in the data heap binary tree.

9. The method of claim 8, further comprising the step of running the first and second data stream tagging applications on different physical processors.

10. One or more non-transitory computer readable storage media, having computer-executable instructions embodied thereon, wherein when executed by at least one processor, the computer-executable instructions cause the at least one processor to:
   a. receive a data stream at a controller, wherein the data stream comprises a plurality of data items being directed into a data heap from a plurality of separate sources, wherein the data heap comprises a binary tree in which a key value in each of a plurality of parent nodes is always greater than or equal to a key value in a corresponding child node or always less than or equal to the key value in such corresponding node;
   b. apply a first data stream tagging application to each data item to search each data item for a match to a first indicium;
   c. if a first indicium match is found, then with the first data stream tagging application tag the data item having the matched first indicium with a first tag comprising a first text string;
   d. apply a second data stream tagging application to each data item to search each data item for a match to a second indicium, wherein the first indicium and second indicium are not the same;
   e. if a second indicium match is found, then with the second data stream tagging application tag the data item having the matched second indicium with a second tag comprising a second text string; and
   f. after applying the first data stream tagging application and second data stream tagging application to the data stream, store each data item in the data stream in the data heap binary tree.

11. The storage media of claim 10, wherein the computer-executable instructions cause processes (b) to (e) to be performed before any data item in the data stream is formatted into the data heap.

12. The storage media of claim 11, wherein the computer-executable instructions cause processes (b) to (e) to be performed before any data item in the data stream is catalogued into the data heap.

13. The storage media of claim 12, wherein the computer-executable instructions cause the one or more processors to make a copy of the data item and send the copy of the data item to one or both of an application programming interface or a tagged data database.

14. The storage media of claim 12, wherein the computer-executable instructions cause the one or more processors to move the data item from the data stream such that the data item is not stored in the data heap.

15. The storage media of claim 12, wherein the computer-executable instructions further cause the one or more processors to:
   a. after receiving the data stream at the controller, divide the data stream into first and second data streams each containing a plurality of data items;
   b. apply the first data stream tagging application to each data item in the first data stream, and simultaneously apply a third data stream tagging application to each data item in the second data stream, wherein the first and third data stream tagging applications search each data item in the first data stream for a match to the first indicium;
   c. if a first indicium match is found by either the first or third data stream tagging applications, then with the first data stream tagging application or third data stream tagging application tag the data item having the matched first indicium with the first tag;
   d. apply the second data stream tagging application to each data item in the first data stream, and simultaneously apply a fourth data stream tagging application to each data item in the second data stream, wherein the second and fourth data stream tagging applications search each data item in the second data stream for a match to the second indicium; and
   e. if a second indicium match is found by either the second or fourth data stream tagging applications, then with the second data stream tagging application or the fourth data stream tagging application tag the data item having the matched second indicium with the second tag.

16. The storage media of claim 15, wherein the computer-executable instructions further cause the one or more processors to run the first and third data stream tagging applications on different physical processors, and to run the second and fourth data stream tagging applications on different physical processors.

17. One or more non-transitory computer readable storage media, having computer-executable instructions embodied thereon, wherein when executed by at least one processor, the computer-executable instructions cause the at least one processor to:
   a. receive a data stream at a controller, wherein the data stream comprises a plurality of data items being directed into a data heap from a plurality of separate data sources, wherein the data heap comprises a binary tree in which a key value in each of a plurality of parent nodes is always greater than or equal to a key value in a corresponding child node or always less than or equal to the key value in such corresponding node;
   b. apply a first data stream tagging application to a first subset of the data items in the data stream, wherein the first data stream tagging application is configured to search each data item for a match to an indicium;
   c. if an indicium match is found by the first data stream tagging application, then with the first data stream tagging application tag the data item having the matched indicium with a first text tag;
   d. apply a second data stream tagging application to a second subset of the data items in the data stream, wherein the first subset of data items and second subset of data items are exclusive of each other, and wherein the second data stream tagging application is configured to search each data item for a match to the indicium;
   e. if the indicium match is found by the second data stream tagging application and the data item is not already tagged, then with the second data stream tagging application tag the data item having the matched indicium with a second text tag; and
   f. after applying the first data stream tagging application and second data stream tagging application to the data stream, store each data item in the data stream in the data heap binary tree.

18. The storage media of claim 17, wherein the computer-executable instructions further cause the one or more processors to run the first and second data stream tagging applications on different physical processors.

19. An apparatus for primary tagging of data, comprising:
   a. an input for receiving a data stream comprising a plurality of data items from a plurality of separate sources;
   b. a first data stream tagging application executing at one or more controllers in communication with the input, wherein the first data stream tagging application is configured to search each of the data items in the data stream for a match to a first indicium, to tag matching data items with a first tag comprising a first text string, and to divert such data item if a match is found;
   c. a second data stream tagging application executing at one or more controllers in communication with the input, wherein the first data stream tagging application is configured to search each of the data items in the data stream for a match to a second indicium, to tag matching data items with a second tag comprising a second text string, and to divert such data item if a match is found; and
   d. a data heap in communication with the one or more controllers and configured to receive the data items from the data stream, wherein the data heap comprises a binary tree in which a key value in each of a plurality of parent nodes is always greater than or equal to a key value in a corresponding child node or always less than or equal to the key value in such corresponding node.

20. The apparatus of claim 19, further comprising a plurality of data sources configured to generate the data stream, wherein the plurality of data sources are in communication with the one or more controllers.

21. The apparatus of claim 19, wherein the controller is further configured to divide the data stream into first and second data streams.

22. The apparatus of claim 21, wherein the first data stream tagging application is configured to search only the data items in the first data stream.

23. The apparatus of claim 22, wherein the second data stream tagging application is configured to search only the data items in the second data stream.

24. The apparatus of claim 23, wherein the one or more controllers comprises a plurality of physical processors, and wherein the first and second data stream tagging applications are configured to run on separate physical processors.

25. The apparatus of claim 24, wherein the first and second data stream tagging applications are configured to execute simultaneously.

26. The apparatus of claim 19, wherein the first and second indicia are the same.

27. The apparatus of claim 26, wherein the one or more controllers comprises a plurality of physical processors and wherein the first and second data stream tagging applications are configured to run on separate physical processors.

28. The apparatus of claim 27, wherein the first and second data stream tagging applications are configured to execute simultaneously.

29. The apparatus of claim 28, wherein the first data stream tagging application is configured to search a first subset of the data items in the data stream, and the second data stream tagging application is configured to search a second subset of the data items in the data stream.

* * * * *